Patented Oct. 5, 1937

2,094,717

UNITED STATES PATENT OFFICE 2,094,717

MOISTUREPROOF MATERIAL

Arloe R. Olsen, Wilmington, Del., assignor to Hercules Powder Company, Wilmington, Del., a corporation of Delaware No Drawing. Application February 1, 1935, Serial No. 4,521

11 Claims. (Cl. 91—68)

This invention relates to a moistureproof material, and more particularly to a moistureproof material comprising a base of cellulosic material, preferably transparent sheet cellulosic material, as, for example, glassine paper, regenerated cellulose, etc., or of other transparent sheet material, as, for example, a cellulose ester or ether, gelatin, agar-agar, etc., coated with a moisture-proofing composition comprising chlorinated rubber and an abietyl or hydrogenated abietyl compound, preferably one which will act as a plasticizer or flexilizer for the chlorinated rubber.

The term "moistureproof", as understood by the art and as used in this specification, describes a coated base material which has a moisture permeability of, at most, one-tenth of the moisture permeability of the uncoated base material employed in its production, and also describes a coating composition capable of producing this reduction in moisture permeability when applied to a base material in a relatively thin coating, of, for example, in a weight coating of from 2 to 5 pounds per 3000 square feet of base material. Heretofore it has been considered impossible to produce a composition capable of moistureproofing these base materials without the inclusion of a wax or waxy material in the moistureproofing composition. In fact it has always been thought that the moistureproofing qualities of these compositions were due almost entirely to their wax content.

The inclusion of wax in various types of coating compositions in order to give them a moistureproofing character has produced many difficulties in the application of such coatings to base materials not encountered in the application of wax-free compositions. These difficulties have arisen particularly in the drying of the moistureproofing compositions, but have been regarded as caused by unavoidable characteristics inherent in moistureproofing compositions.

Now in accordance with this invention it has been found that an improved moistureproof material may be produced by coating a base material, as, for example, sheet cellulosic material, preferably transparent, as glassine, regenerated cellulose, etc., cellulose esters and ethers, gelatine, agar-agar, etc., in sheet form, etc., with a moistureproof composition comprising chlorinated rubber and an abietyl or hydrogenated-abietyl compound, preferably one capable of plasticizing the chlorinated rubber, as, for example, methyl abietate, ethyl abietate, amyl abietate, hydrogenated methyl abietate, hydrogenated ethyl abietate, hydrogenated amyl abietate, abietyl alcohol, hydrogenated abietyl alcohol, abietyl stearate, etc. Where the flexibility of the moistureproof coating is not of great importance, non-plasticizing abietyl or hydrogenated abietyl compounds, as, for example, abietic acid, glyceryl abietate, etc., may be used.

For producing the moistureproof material in accordance with this invention the coating compositions including chlorinated rubber and various hydrogenated or unhydrogenated abietic acid esters described in U. S. Patent No. 1,957,786, to William Koch, dated May 8, 1934, may be used, but it will be understood that the present invention is not limited to moistureproof materials produced by the use of such compositions.

The chlorinated rubber for use in the moistureproofing composition in accordance with this invention may be produced by the chlorination of raw or vulcanized rubber by any of the processes generally used in its production. Desirably, the chlorinated rubber employed will have a chlorine content of from about 60 to about 68%, altho any chlorinated rubber having a chlorine content of 50% or more may be used. The viscosity characteristics of the chlorinated rubber employed may vary widely and will be selected with a view to the desired viscosity and chlorinated rubber content of the moistureproofing composition.

Any abietyl or hydrogenated abietyl compound, but preferably one that has a plasticizing action on chlorinated rubber, may be used in formulating the moistureproofing composition in accordance with this invention. The following compounds are examples of such materials: methyl abietate, ethyl abietate, amyl abietate, hydrogenated methyl abietate, hydrogenated ethyl abietate, hydrogenated amyl abietate, abietyl alcohol, hydrogenated abietyl alcohol, abietyl stearate, etc. While there is no difference in their moistureproofing action, it is preferable to use hydrogenated abietyl compounds rather than the unhydrogenated, since the latter are less stable and discolor on prolonged exposure to light. It will be understood, however, that the use of both types of compounds is contemplated in the present invention.

The exact formulation of the chlorinated rubber coating composition to be used in any given case will depend upon the flexibility desired, the degree of moistureproofness desired and the specific abietyl compound used as a plasticizer. For a given compound, the moistureproofness will increase in proportion to the amount of the compound used. This likewise holds true for the flexibility. When using the same proportion of different abietyl compounds, different flexibilities and moisture permeabilities will be produced. In other words, the effect of various of the abietyl compounds on moisture permeability and flexibility is not the same.

Preferably the abietyl compound or hydrogenated abietyl compound will be included in the moistureproofing composition in amount constituting from about 40% to about 80% by weight of the amount of chlorinated rubber present. The most desirable amount of such abietyl compounds has been found to be from about 50% to about 60% by weight of the chlorinated rubber content.

The following table shows typical moistureproofing compositions in accordance with this invention. The permeability values are for glassine paper coated with a coating of 3 lbs. per 3000 square feet of the respective compositions:

| Moistureproofing composition (non-volatile constituents) | Moisture permeability value (grams/sq. meter 24 hours) |
|---|---|
| 10 parts chlorinated rubber—6 parts amyl abietate | 4 |
| 10 parts chlorinated rubber—6 parts abietyl stearate | 1 |
| 10 parts chlorinated rubber—6 parts hydrogenated abietyl alcohol | 9 |
| 10 parts chlorinated rubber—6 parts hydrogenated methyl abietate | 16 |

The above permeability values are directly comparable with a permeability of 300–400 for uncoated glassine paper; 108 (4 lb. coating) for glassine coated with unplasticized chlorinated rubber; 127 (4 lb. coating) for glassine coated with a composition comprising 10 parts chlorinated rubber and 4 parts tricresyl phosphate; and 101 for glassine coated (4 lb. coating) with a composition comprising 10 parts chlorinated rubber and 3 parts dibutyl phthalate.

The non-volatile constituents of the moistureproofing compositions in accordance with this invention may be dissolved in a solvent, as, for example benzene, toluene, xylan or ethyl acetate, coal tar naphtha, etc., for ready application to base material. These solutions can then be applied very satisfactorily by the methods ordinarily used, such as spraying, dipping, coating by the use of a doctor blade, etc. The viscosity of the solution used will depend upon the type of sheet to which coating is to be applied, the method of application and the coating thickness desired. The exact viscosity which is to be used in any given case will be obvious to those skilled in the art. The viscosity of the solution used will depend on its total solids concentration and on the viscosity type of chlorinated rubber used. It is, of course, obvious that for a solution of a given viscosity the higher the solids content of the solution the thicker will be the film applied, and hence the more moistureproof the finished article. It will likewise be obvious that to obtain an increased solids content at a given solution viscosity it is merely necessary to use a chlorinated rubber of correspondingly lower viscosity type. A solids content of approximately 16% has been found in many cases to be desirable for ease of application and production of a suitably thick coating, but this may be varied widely and is not, of course, in any way critical.

The thickness of moistureproof coating to be applied to the base material must be sufficient to produce a sufficiently low permeability value, but, in most cases, not such as to impair the transparency of the finished product. A coating of 2 to 5 pounds per 3000 square feet of base material is adequate for moistureproofness and will not impair the transparency of the coated material.

Abietyl compounds, as the term is used in this specification and in the claims hereinafter set forth, are defined as compounds containing the carbon skeleton of the hydrocarbon nucleus of abietic acid, and include hydrogenated abietyl compounds, the latter compounds being specifically characterized as hydrogenated abietyl compounds.

What I claim and desire to protect by Letters Patent is:

1. A flexible, transparent, moistureproof sheet comprising a sheet of transparent cellulosic material selected from the group consisting of glassine paper and regenerated cellulose coated with a transparent chlorinated rubber film containing a compound having the hydrocarbon nucleus of abietic acid in amount sufficient to produce a moistureproof film but insufficient to impair the transparency of the film.

2. A flexible, transparent, moistureproof material comprising a sheet of regenerated cellulose coated with a transparent chlorinated rubber film containing a compound having the hydrocarbon nucleus of abietic acid in amount sufficient to produce a moistureproof film but insufficient to impair the transparency of the film.

3. A flexible, transparent, moistureproof material comprising a sheet of glassine paper coated with a transparent chlorinated rubber film containing a compound having the hydrocarbon nucleus of abietic acid in amount sufficient to produce a moistureproof film but insufficient to impair the transparency of the film.

4. A flexible, transparent, moistureproof sheet comprising a sheet of transparent cellulosic material selected from the group consisting of glassine paper and regenerated cellulose coated with a transparent chlorinated rubber film containing a compound having the hydrocarbon nucleus of abietic acid and capable of plasticizing chlorinated rubber in amount sufficient to produce a moistureproof film but insufficient to impair the transparency of the film.

5. A flexible, transparent, moistureproof sheet comprising a sheet of transparent cellulosic material selected from the group consisting of glassine paper and regenerated cellulose coated with a transparent chlorinated rubber film containing a compound having the hydrocarbon nucleus of hydroabietic acid in amount sufficient to produce a moistureproof film but insufficient to impair the transparency of the film.

6. A flexible, transparent, moistureproof sheet comprising a sheet of transparent cellulosic material selected from the group consisting of glassine paper and regenerated cellulose coated with a transparent chlorinated rubber film containing a compound having the hydrocarbon nucleus of hydroabietic acid and capable of plasticizing chlorinated rubber in amount sufficient to produce a moistureproof film but insufficient to impair the transparency of the film.

7. A flexible, transparent, moistureproof sheet comprising a sheet of transparent cellulosic material selected from the group consisting of glassine paper and regenerated cellulose coated with a transparent chlorinated rubber film containing hydrogenated methyl abietate in amount sufficient to produce a moistureproof film but insufficient to impair the transparency of the film.

8. A flexible, transparent, moistureproof sheet comprising a sheet of transparent cellulosic material selected from the group consisting of glassine paper and regenerated cellulose coated with a transparent chlorinated rubber film containing abietyl stearate in amount sufficient to produce a moistureproof film but insufficient to impair the transparency of the film.

9. A flexible, transparent, moistureproof sheet comprising a sheet of transparent cellulosic material selected from the group consisting of glassine paper and regenerated cellulose coated with a transparent chlorinated rubber film containing amyl abietate in amount sufficient to produce a moistureproof film but insufficient to impair the transparency of the film.

10. A flexible, transparent, moistureproof sheet comprising a sheet of transparent cellulosic material, selected, from the group consisting of glassine paper and regenerated cellulose coated with a transparent chlorinated rubber film containing a compound having the hydrocarbon nucleus of abietic acid and capable of plasticizing chlorinated rubber in amount of from about 40% to about 80% by weight of the chlorinated rubber.

11. A flexible, transparent, moistureproof sheet comprising a sheet of transparent cellulosic material selected from the group consisting of glassine paper and regenerated cellulose coated with a transparent chlorinated rubber film containing a compound selected from the group consisting of abietic acid esters, abietyl alcohol, abietyl alcohol esters, hydrogenated abietic acid esters, hydrogenated abietyl alcohol and hydrogenated abietyl alcohol esters, in amount sufficient to produce a moistureproof film but insufficient to impair the transparency of the film.

ARLOE R. OLSEN.